US012434382B2

(12) United States Patent
Kanai et al.

(10) Patent No.: US 12,434,382 B2
(45) Date of Patent: Oct. 7, 2025

(54) ROBOT TEACHING SYSTEM

(71) Applicant: Hitachi High-Tech Corporation, Tokyo (JP)

(72) Inventors: Yoshiki Kanai, Tokyo (JP); Shinichi Ishikawa, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 130 days.

(21) Appl. No.: 18/539,896

(22) Filed: Dec. 14, 2023

(65) Prior Publication Data

US 2024/0238969 A1 Jul. 18, 2024

(30) Foreign Application Priority Data

Jan. 13, 2023 (JP) .................................. 2023-003839

(51) Int. Cl.
*B25J 9/16* (2006.01)
(52) U.S. Cl.
CPC ............. *B25J 9/163* (2013.01); *B25J 9/1697* (2013.01)
(58) Field of Classification Search
CPC ........ B25J 9/163; B25J 9/1697; B25J 9/1692; G05B 2219/45083; G05B 2219/36453; G05B 2219/39008
See application file for complete search history.

(56) References Cited

U.S. PATENT DOCUMENTS 9,189,702 B2 * 11/2015 Wang ........................ G06T 7/33
9,669,545 B2 * 6/2017 Suzuki .................. B25J 9/1692
9,981,380 B2 * 5/2018 Setsuda ................ G05B 19/425
10,525,597 B2 * 1/2020 Harada .................. B25J 9/1697
2023/0011979 A1 1/2023 Judt et al.
(Continued)

FOREIGN PATENT DOCUMENTS

DE 102014208530 A1 11/2015
DE 102015206575 A1 10/2016
DE 102022122658 A1 4/2023
(Continued)

OTHER PUBLICATIONS

German Office Action issued on Dec. 5, 2024 for German Patent Application No. 102023134659.8.

*Primary Examiner* — Dalena Tran
(74) *Attorney, Agent, or Firm* — Volpe Koenig

(57) ABSTRACT

A robot teaching system reproduces predetermined work with high accuracy. A position/posture fixing tool having a gripped structure in which a position/posture with respect to a first end effector and a second end effector are uniquely determined; and a teaching data transformation unit that transforms first teaching data representing position/posture information of the first end effector during a teaching operation into second teaching data representing position/posture information of the second end effector are included. The teaching data transformation unit transforms the first teaching data into the second teaching data using a first relative position/posture indicating a relative position/posture between the first end effector and the position/posture fixing tool when the position/posture fixing tool is gripped, and a second relative position/posture indicating a relative position/posture between the second end effector and the position/posture fixing tool when the position/posture fixing tool is gripped.

10 Claims, 7 Drawing Sheets

(56) References Cited

U.S. PATENT DOCUMENTS

2023/0120598 A1 4/2023 Wang et al.
2023/0166392 A1* 6/2023 Kuribayashi ..... H01L 21/67742

FOREIGN PATENT DOCUMENTS

| EP | 1987406 B1 | 8/2010 |
| EP | 3081347 A2 | 10/2016 |
| EP | 3609656 B1 | 2/2020 |
| WO | 2017036520 A1 | 3/2017 |
| WO | 2021/122580 A1 | 6/2021 |

* cited by examiner

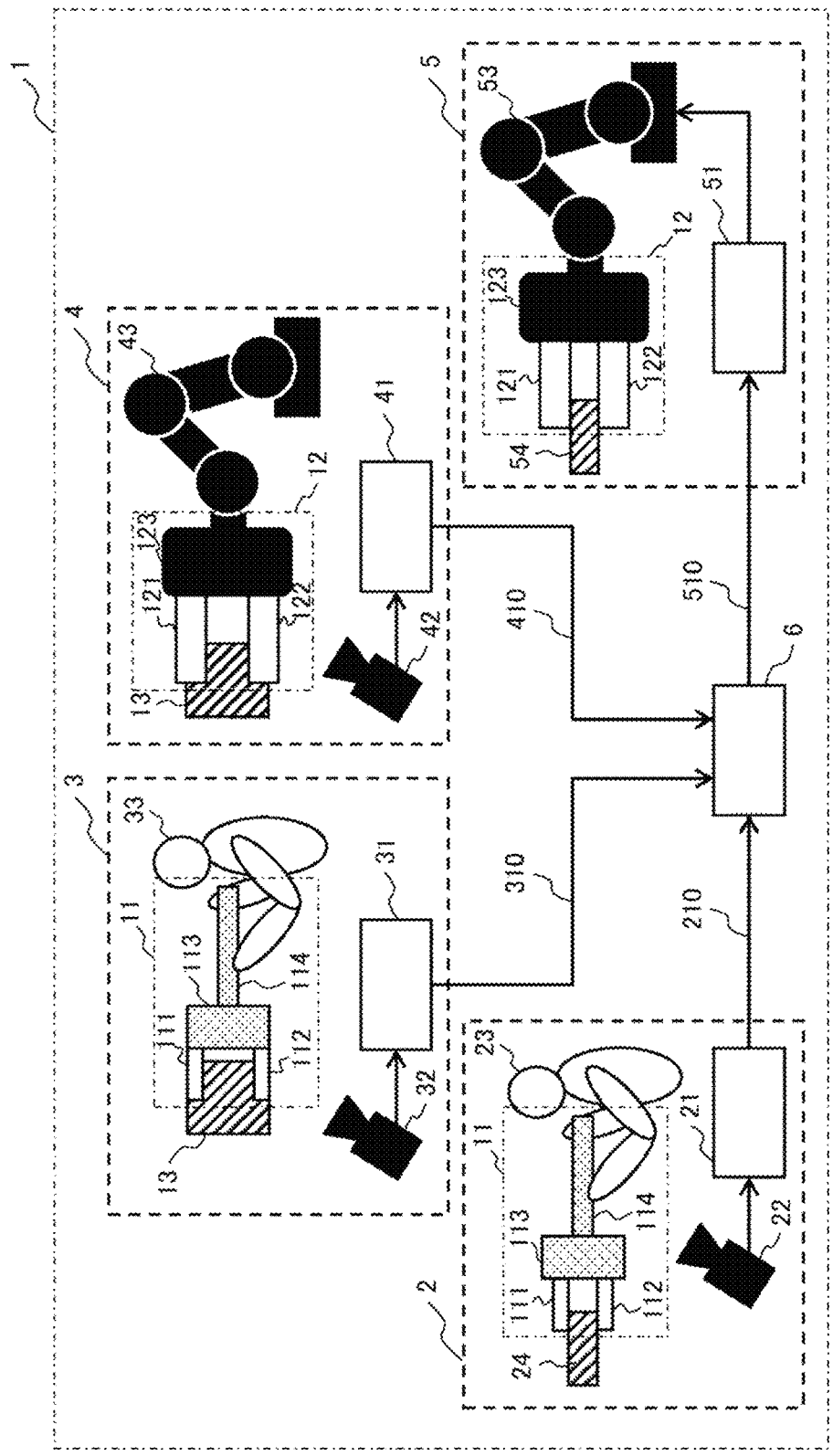
[FIG. 1]

[FIG. 2A]
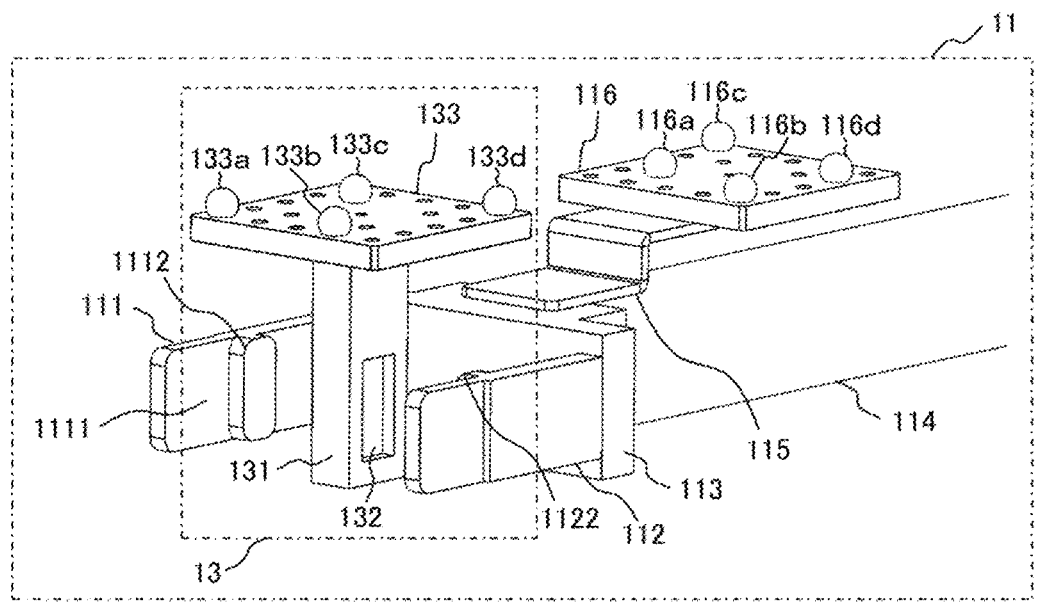
[FIG. 2B]
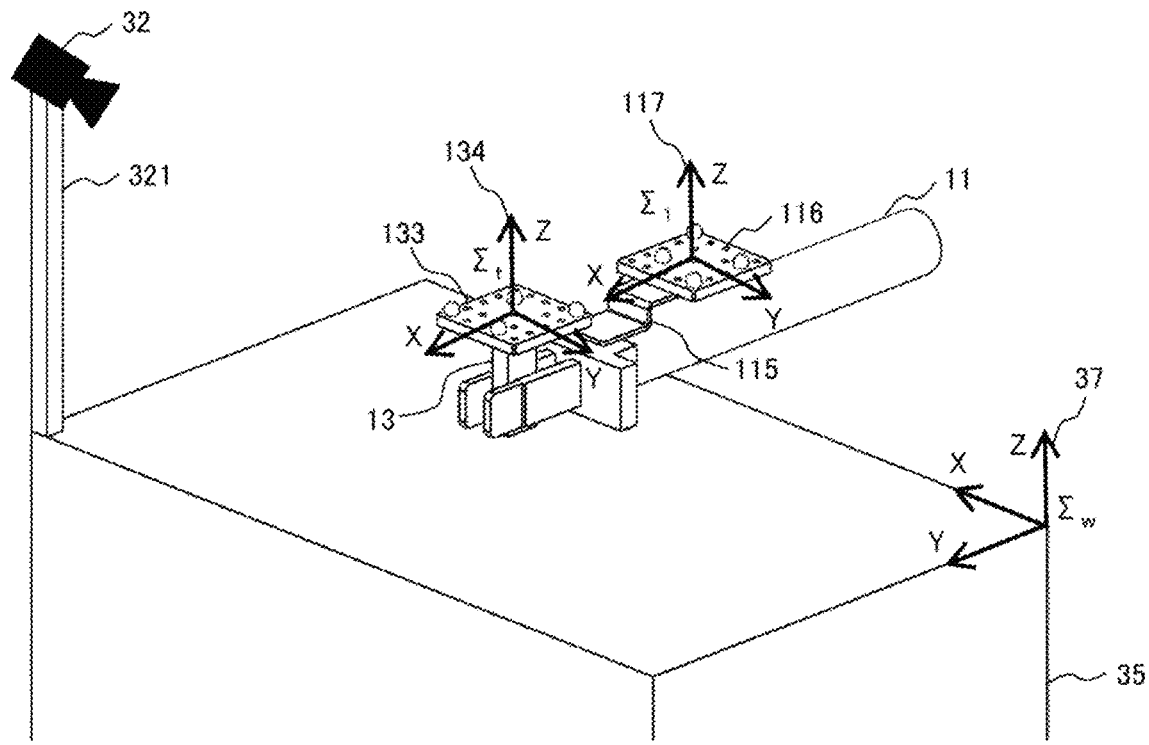

[FIG. 3A]
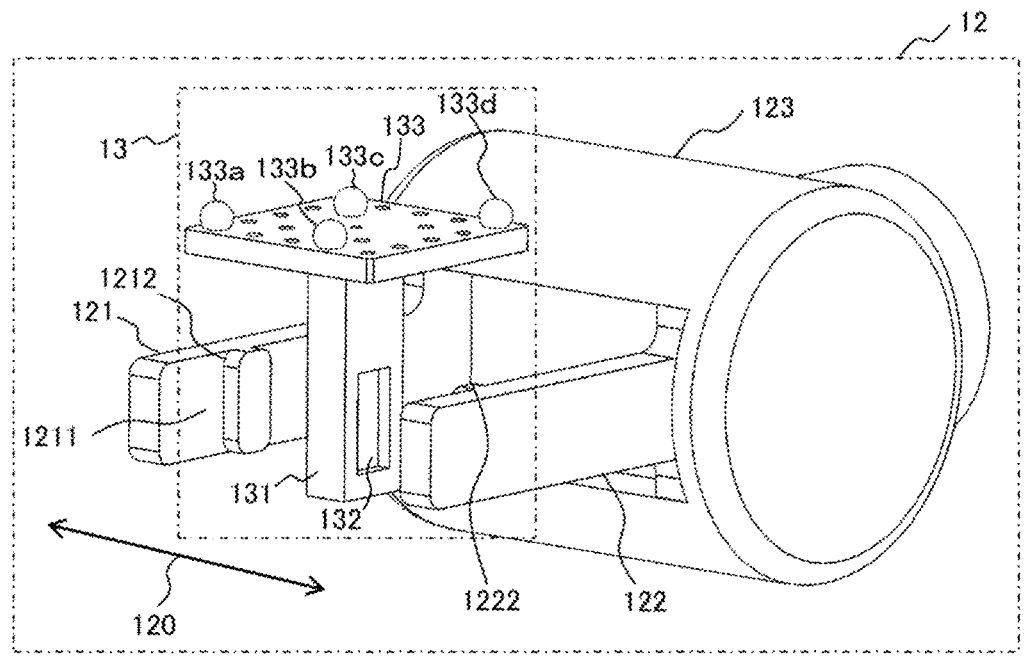
[FIG. 3B]
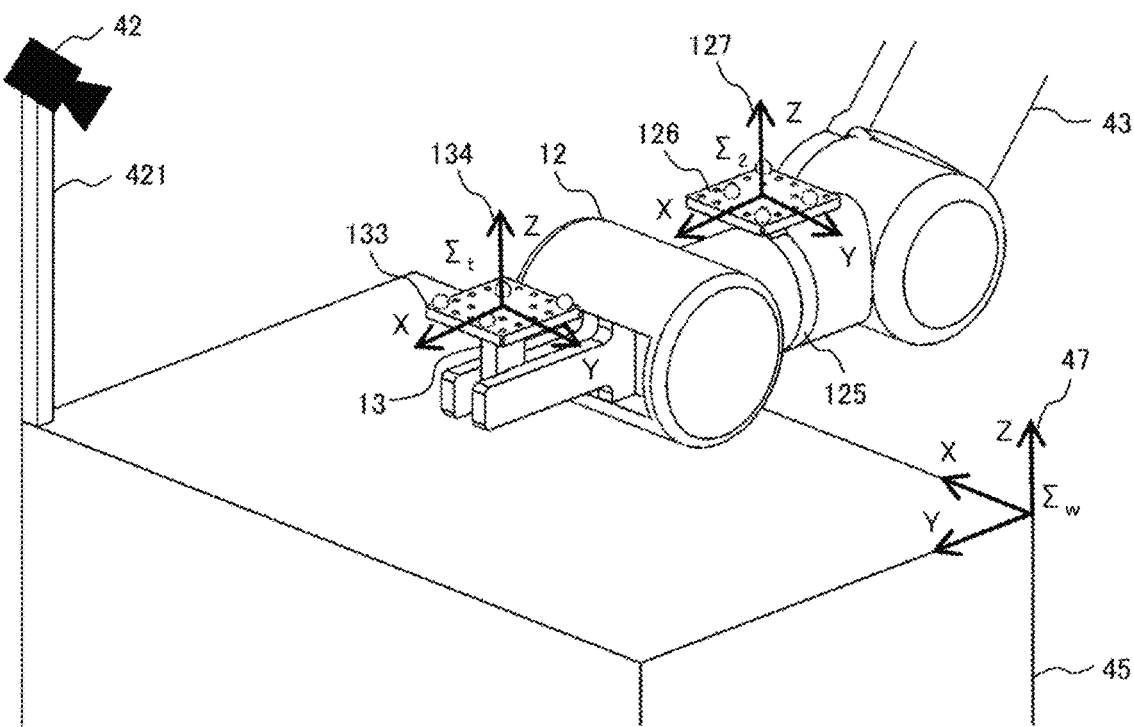

[FIG. 4]
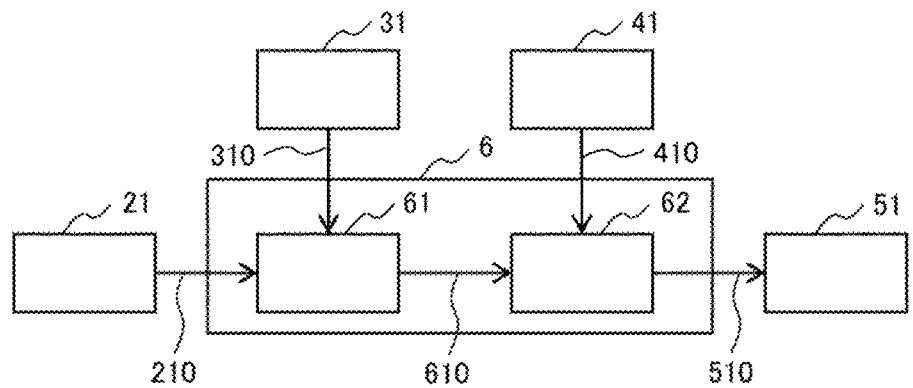
[FIG. 5A]
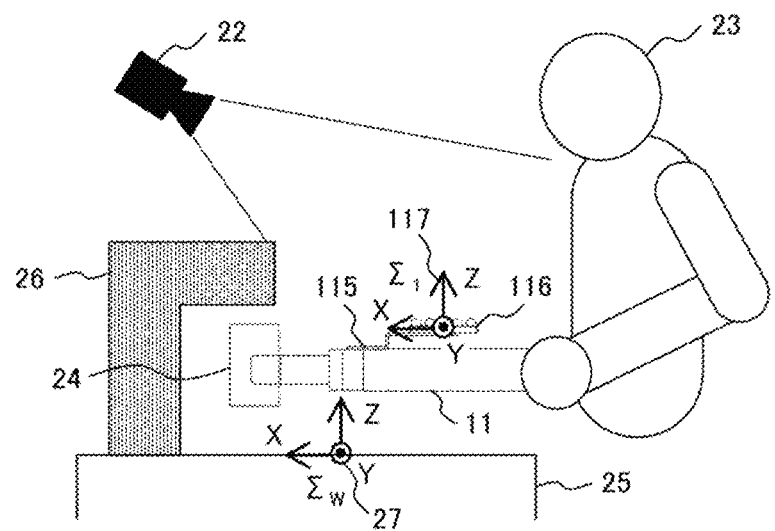
[FIG. 5B]
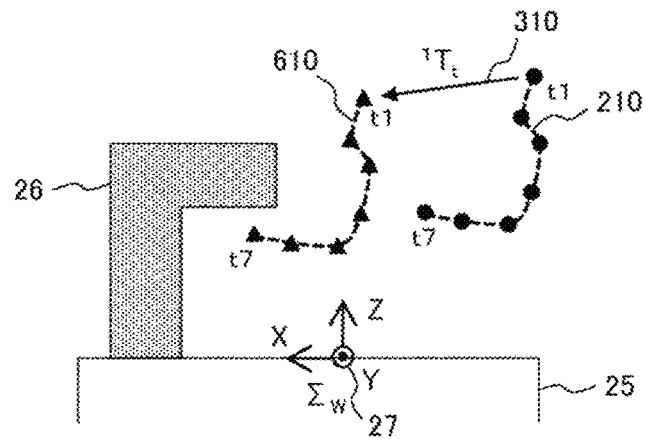

[FIG. 5C]
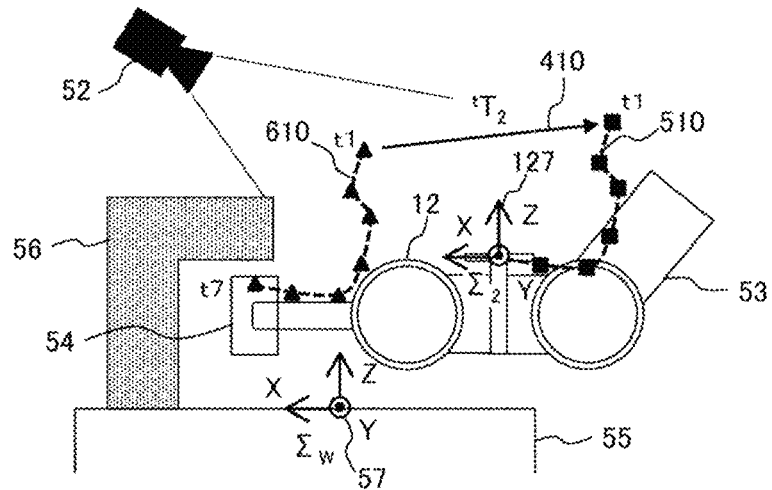
[FIG. 6]
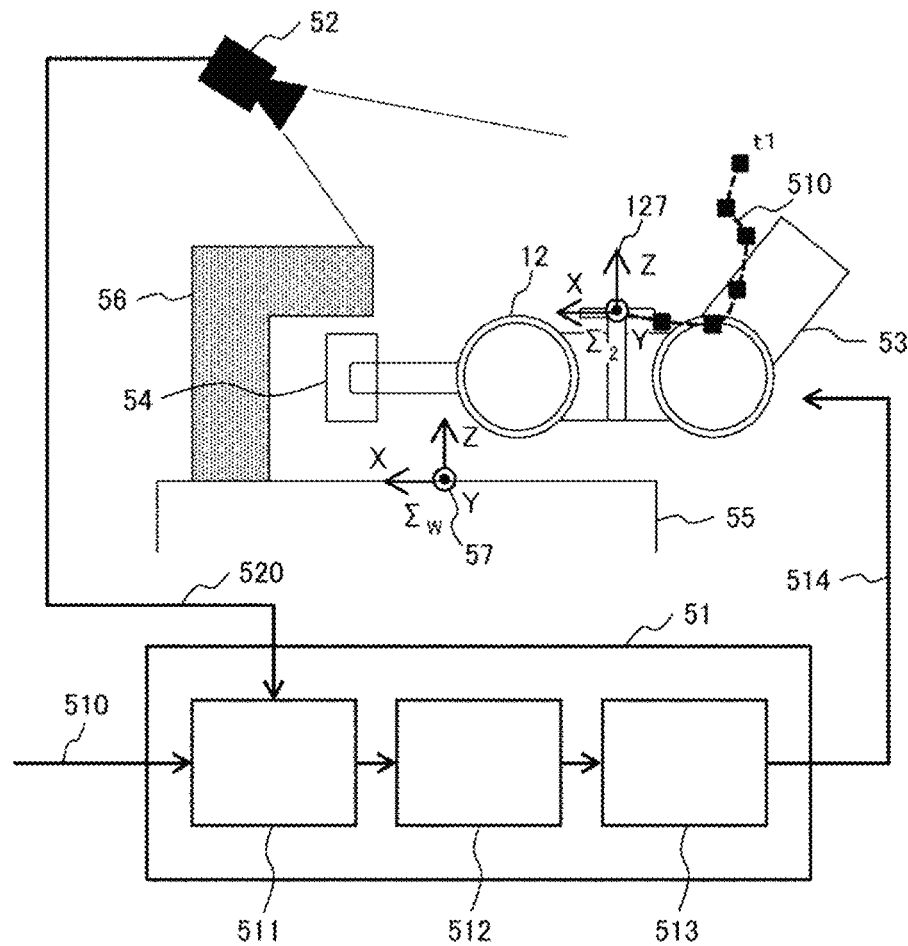

[FIG. 7A]
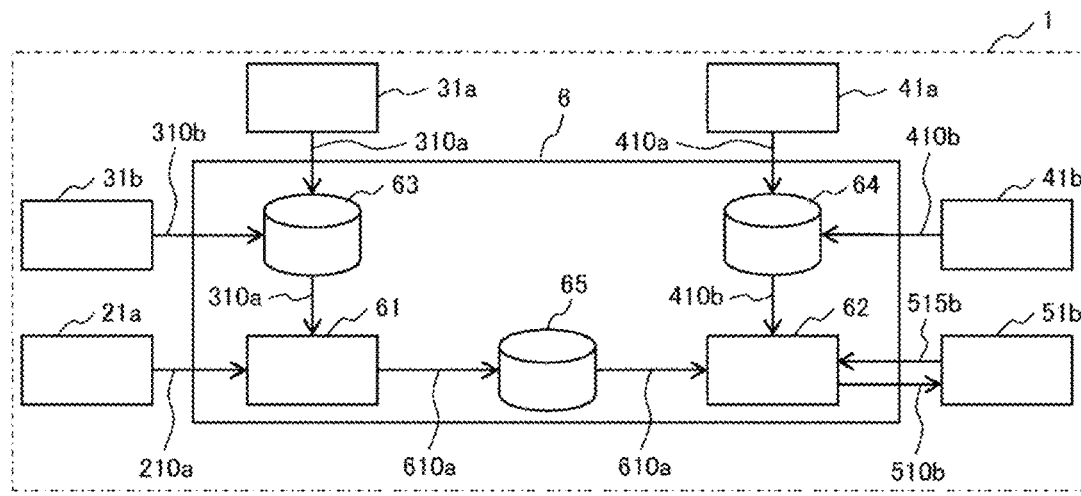
[FIG. 7B]
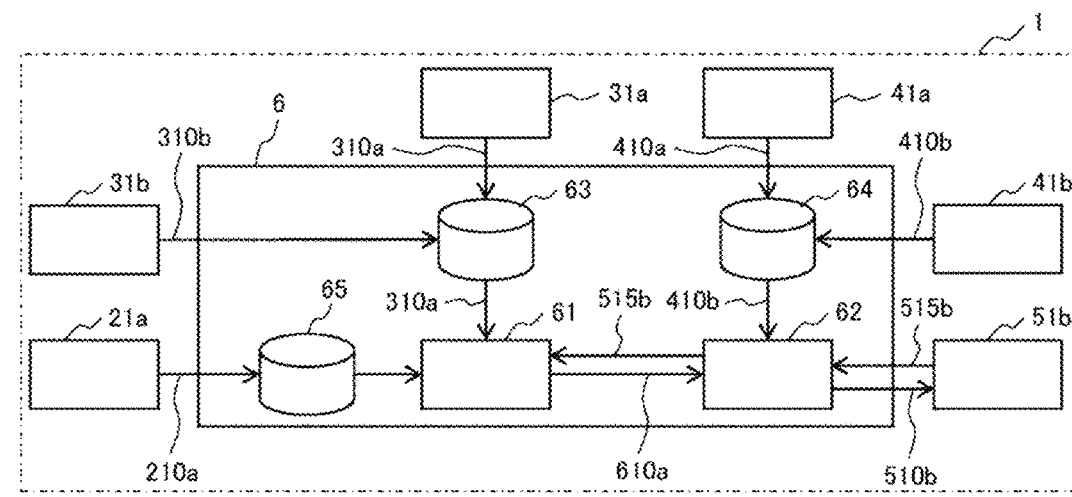
[FIG. 7C]
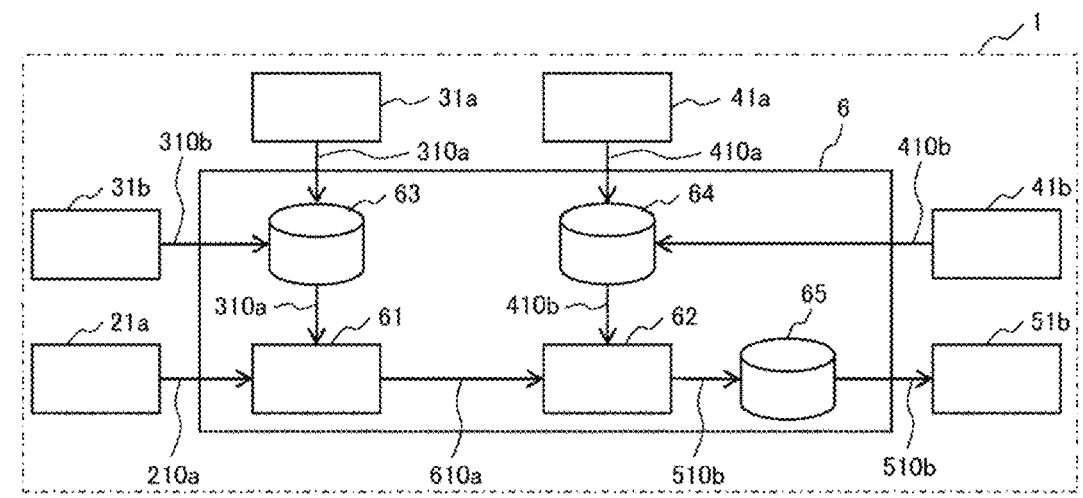

[FIG. 8]
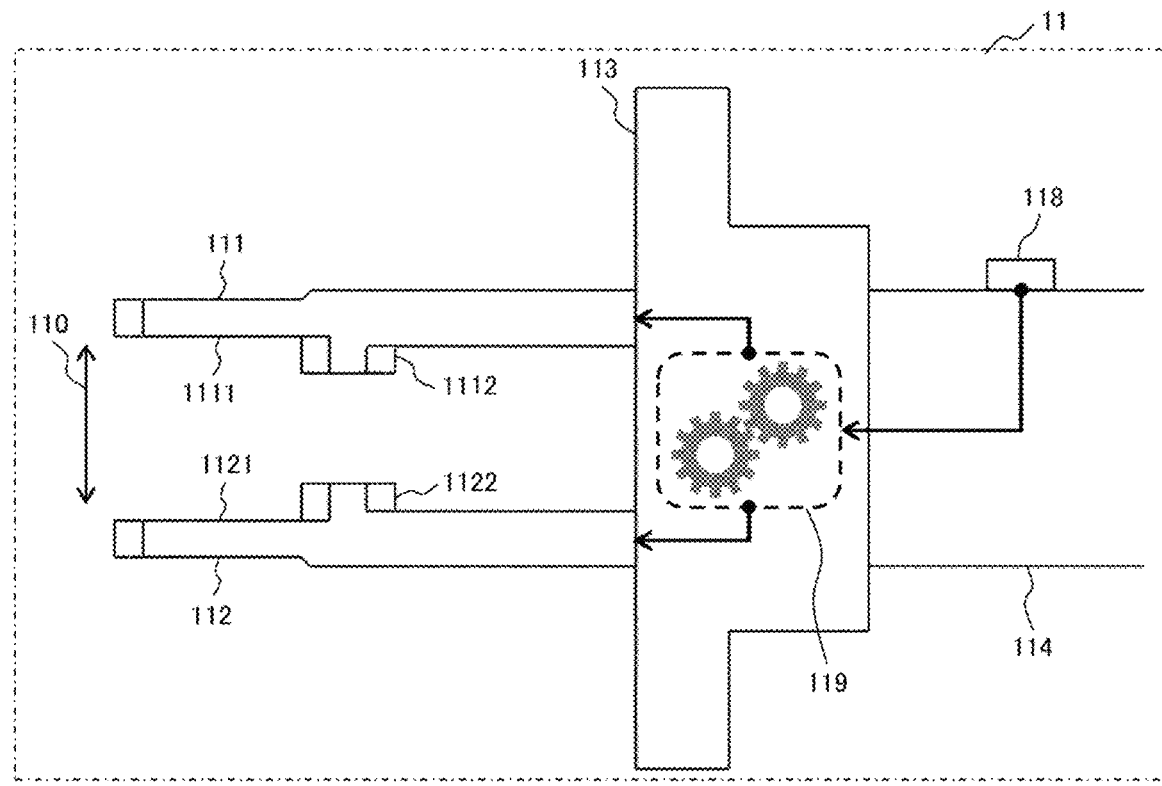
[FIG. 9]
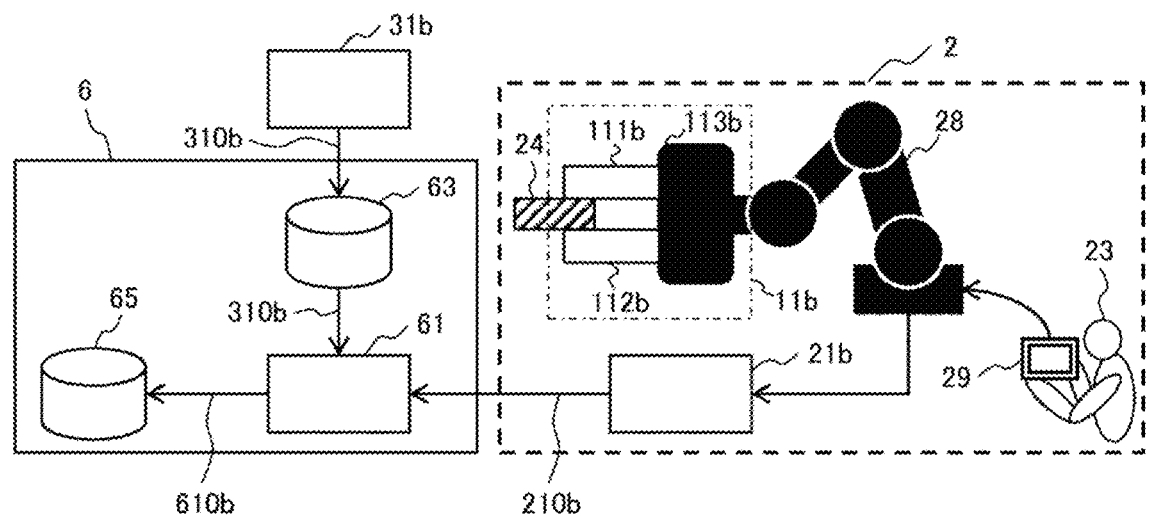

ROBOT TEACHING SYSTEM

REFERENCE TO RELATED APPLICATIONS

The present application claims priority from Japanese Patent Application serial no. 2023-003839, filed on Jan. 13, 2023, the content of which is hereby incorporated by reference into this application.

TECHNICAL FIELD

The present invention relates to a robot teaching system that teaches a robot to do predetermined work.

BACKGROUND ART

As robot teaching systems that teach robots to do predetermined work, systems in which teachers holding teaching devices and robots are caused to reproduce demonstrated work are known.

For example, PTL 1 discloses a robot teaching system in which a teacher holding a teaching device demonstrates predetermined work, a trajectory of the device is acquired by a sensor, and then an operation program for a robot is automatically generated based on a sensor value. In the teaching device of PTL 1, various tools (corresponding to "end effectors) can be mounted to correspond to teachings of various types of work.

CITATION LIST

Patent Literature

PTL 1: WO2021/122580

SUMMARY OF INVENTION

Technical Problem

In the robot teaching system disclosed in PTL 1, however, an error of a position or posture occurs in teaching data due to a device difference or a structure difference caused between an end effector mounted on the teaching device and an end effector mounted on the robot, and thus there is a problem that reproduction accuracy of taught work deteriorates.

The present invention has been devised in view of the foregoing problem and an object of the present invention is to provide a robot teaching system capable of reproducing predetermined taught work with high accuracy even when there is a device difference or a structure difference between an end effector used for teaching and an end effector mounted on a robot.

Solution to Problem

According to an aspect of the present invention, a robot teaching system includes: a first end effector having a gripping structure and used for teaching; a second end effector having the gripping structure and mounted on a robot; a position/posture fixing tool having a gripped structure in which a position and a posture with respect to the first end effector and the second end effector are uniquely determined by being gripped by the gripping structure of the first end effector and the second end effector; a teaching data transformation unit configured to transform first teaching data representing position/posture information of the first end effector during a teaching operation into second teaching data representing position/posture information of the second end effector; and a robot control unit configured to cause the robot to operate based on the second teaching data. The teaching data transformation unit transforms the first teaching data into the second teaching data using a first relative position/posture indicating a relative position/posture between the first end effector and the position/posture fixing tool when the position/posture fixing tool is gripped, and a second relative position/posture indicating a relative position/posture between the second end effector and the position/posture fixing tool when the position/posture fixing tool is gripped.

Advantageous Effects of Invention

According to the present invention, it is possible to provide a robot teaching system capable of reproducing predetermined taught work with high accuracy even when there is a device difference or a structure difference between an end effector used for teaching and an end effector mounted on a robot.

BRIEF DESCRIPTION OF DRAWINGS

FIG. 1 is a diagram illustrating an operation of a robot teaching system according to a first embodiment.

FIG. 2A is a diagram illustrating a detailed configuration of a first end effector and a position/posture fixing tool according to the first embodiment.

FIG. 2B is a diagram illustrating a first relative position/posture calculation process according to the first embodiment.

FIG. 3A is a diagram illustrating a detailed configuration of a second end effector and the position/posture fixing tool according to the first embodiment.

FIG. 3B is a diagram illustrating a second relative position/posture calculation process according to the first embodiment.

FIG. 4 is a diagram illustrating an operation of a teaching data transformation unit according to the first embodiment.

FIG. 5A is a diagram illustrating a first end effector use teaching process according to the first embodiment.

FIG. 5B is a diagram illustrating an image of coordinate transformation in a first coordinate transformation unit shown on a work space according to the first embodiment.

FIG. 5C is a diagram illustrating an image of coordinate transformation and a robot operation process in a second coordinate transformation unit shown on a work space according to the first embodiment.

FIG. 6 is a diagram illustrating a robot control unit according to the first embodiment.

FIG. 7A is a diagram illustrating a configuration and an operation of a teaching data transformation unit according to a second embodiment.

FIG. 7B is a diagram illustrating an example of another configuration of the teaching data transformation unit according to the second embodiment.

FIG. 7C is a diagram illustrating an example of another configuration of the teaching data transformation unit according to the second embodiment.

FIG. 8 is a diagram illustrating a first end effector according to a third embodiment.

FIG. 9 is a diagram illustrating a first end effector use teaching process according to a fourth embodiment.

DESCRIPTION OF THE INVENTION

Hereinafter, embodiments will be described with reference to the drawings. The drawings illustrate embodiments and mounting examples in conformity with principles of the present disclosure, these drawings are used for understanding of the present disclosure and are not used for limited interpretation of the present disclosure. The description of the present specification are typical examples and does not limit claims or application examples of the present disclosure in any sense.

Hereinafter, description is made in sufficient detail for implementation of the present disclosure for those skilled in the art, but other mounting forms are possible and changes of configurations and structures or substitution of various elements can be made without departing from the scope of technical spirits of the present disclosure.

First Embodiment

FIG. 1 is a diagram illustrating an operation of a robot teaching system according to a first embodiment. In the robot teaching system 1, a situation is assumed in which teaching is performed on any robot 53 on which a second end effector 12 is mounted. A teacher 23 performs teaching by causing the robot 53 on which the second end effector 12 is mounted to reproduce a position and posture of a first end effector 11 when predetermined work is demonstrated using the first end effector 11 instead of the actual robot 53 and the second end effector 12. Hereinafter, the "position and posture" is abbreviated as a "position/posture."

In such teaching, due to a device difference or a structure difference between the first end effector 11 and the second end effector 12 (hereinafter "the device difference or the structure difference" is referred to as a "device difference or the like"), predetermined work is likely to be unreproducible with high accuracy even if the second end effector 12 completely traces a position/posture of the first end effector 11.

Accordingly, according to the technique of the present invention, the device difference or the like between the first end effector 11 and the second end effector 12 is calibrated using a common position/posture fixing tool 13 which can be gripped by both the first end effector 11 and the second end effector 12.

As illustrated in FIG. 1, the robot teaching system 1 broadly perform five processes including a first end effector use teaching process 2, a first relative position/posture calculation process 3, a second relative position/posture calculation process 4, a robot operation process 5, and a teaching data transformation process.

The first end effector use teaching process 2 is a process of measuring, by a measurement unit 22 (for example, an infrared camera), position/posture information of the first end effector 11 when the teacher 23 holding the first end effector 11 demonstrates predetermined work including gripping of a work object 24, and generating first teaching data 210 representing the position/posture information of the first end effector 11 during a teaching operation by a first end effector use teaching unit 21.

The first relative position/posture calculation process 3 is a process of measuring, by a measurement unit 32 (for example, an infrared camera) functioning as a first measurement unit, a position/posture of each of the first end effector 11 and the position/posture fixing tool 13 when the position/posture fixing tool 13 is gripped by the first end effector 11, and calculating a first relative position/posture 310 representing a relative position/posture between the first end effector 11 and the position/posture fixing tool 13 by a first relative position/posture calculation unit 31. The measurement unit 32 may calculate the position/posture of each of the first end effector 11 and the position/posture fixing tool 13 using a design parameter or the like instead of measuring the position/posture of each of the first end effector 11 and the position/posture fixing tool 13.

The second relative position/posture calculation process 4 is a process of measuring, by a measurement unit 42 (for example, an infrared camera) functioning as a second measurement unit, a position/posture of each of the second end effector 12 and the position/posture fixing tool 13 when the position/posture fixing tool 13 is gripped by the second end effector 12, and calculating a second relative position/posture 410 representing a relative position/posture between the second end effector 12 and the position/posture fixing tool 13 by a second relative position/posture calculation unit 41. The measurement unit 42 may calculate the position/posture of each of the second end effector 12 and the position/posture fixing tool 13 using a design parameter or the like, instead of measuring the position/posture of each of the second end effector 12 and the position/posture fixing tool 13.

The robot teaching system 1, an order in which the foregoing processes 2, 3, and 4 are performed does not matter.

The teaching data transformation process is a process in which the teaching data transformation unit 6 transforms the first teaching data 210 into second teaching data 510 using the first relative position/posture 310 and the second relative position/posture 410.

The robot operation process 5 is a process in which a robot control unit 51 controls and operates the robot 53 based on the second teaching data 510. For example, as will be described below, the robot control unit 51 controls the robot 53 such that the position/posture information of the second end effector 12 included in the second teaching data 510 generated by a teaching data transformation unit 6 matches an actual position/posture of the second end effector 12, and causes the robot 53 to reproduce predetermined work including gripping of the work object 54.

FIG. 2A is a diagram illustrating a detailed configuration of the first end effector and the position/posture fixing tool according to the first embodiment.

The first end effector 11 includes, as a gripping structure, a base member 113 in which a position/posture is measured and a pair of gripping members 111 and 112 that are mounted on the base member 113 and sandwich the position/posture fixing tool 13 and the work object. The gripping members 111 and 112 of the first end effector 11 include contact surfaces 1111 (a contact surface of the gripping member 112 is not illustrated) and fitting portions 1112 and 1122, respectively.

In the first embodiment, the first end effector 11 is a tool made by modeling the second end effector 12, is not mounted on the robot, and is held and treated by a worker. Accordingly, a handle member 114 that is held by the worker is mounted on the base member 113 of the first end effector 11. The handle member 114 has a mechanism (not illustrated) which can be removed from the base member 113 and can have any shape so that the teacher can easily perform work. In the first embodiment, a driving source such as an actuator or a battery is not contained, the gripping members 111 and 112 are screwed to the base member 113 so that a configuration can be assembled and altered and a gripping state can be implemented.

A marker 116 is fixed to the base member 113. The marker 116 is measured by the measurement unit 22 or the measurement unit 32 to measure a position/posture of the first end effector 11. In the embodiment, an example in which a marker plate on which reflection spheres 116a to 116d reflecting infrared light are mounted as the markers 116 is used will be described.

Here, for example, when work for causing the first end effector 11 to intrude into a target device is taught in the first end effector use teaching process 2, the markers 116 are likely not to be able to be measured normally by the measurement unit 22 due to occlusion (which is a state where an object behind is hidden by an object in front and is invisible).

Accordingly, a marker fixing member 115 is provided between the markers 116 and the base member 113 so that the occlusion is prevented and the markers 116 can be measured satisfactorily by the measurement unit 22. The marker fixing member 115 is designed to prevent the occlusion. For example, the marker fixing member 115 has a Z type shape or the like.

The position/posture fixing tool 13 includes a grip member 131 and fixing-tool markers 133. In the embodiment, an example in which a marker plate on which reflection spheres 133a to 133d reflecting infrared light are mounted as the markers 133 will be described. The position/posture fixing tool 13 maybe a single independent member or a member protruding as a part of the work object.

The grip member 131 has fittable portions 132 (a fittable portion corresponding to the fitting portion 1112 is not illustrated) fitted in the fitting portion 1112 of the gripping member 111 and the fitting portion 1122 of the gripping member 112.

FIG. 2B is a diagram illustrating the first relative position/posture calculation process according to the first embodiment. In the first relative position/posture calculation process 3, positions/postures of the markers 116 and 133 in which a work table coordinate system 37Σw fixed to the work table 35 is used as a reference are acquired by installing the measurement unit 32 which is a measurement camera at a position at which the entire work table 35 can be overlooked by a measurement unit post 321 and optically detecting light reflected from the markers 116 and 133.

A measurement unit of the markers 116 and 133 in the embodiment is assumed to be an optical motion capture system. Positions/postures of the markers 116 and 133 are calculated by radiating infrared light from the measurement unit 32 which is a measurement camera and using the infrared light reflected from the reflection spheres 116a to 116d and 133a to 133d and an arrangement pattern of the reflection spheres.

A position/posture of the first end effector 11 is expressed on a first end effector coordinate system 117Σ1 fixed to the marker 116.

A position/posture of the position/posture fixing tool 13 is expressed by a fixing tool coordinate system 134Σ1 fixed to the fixing-tool marker 133.

The measurement unit 32 acquires a homogeneous transformation matrix wT1 representing a position/posture of the first end effector coordinate system 117Σ1 in which the work table coordinate system 37Σw is a reference and homogeneous transformation matrix wTt representing a position/posture of the fixing tool coordinate system 134Σt in which the work table coordinate system 37Σw is a reference, and calculate a homogeneous transformation matrix 1Tt as the first relative position/posture 310 by a formula 1Tt=(wT1)$^{-1}$·wTt from the two homogeneous transformation matrices. In the embodiment, a corner of the work table 35 is set as the work table coordinate system 37Σw, but any method may be used to take the work table coordinate system 37Σw.

The first end effector 11 in the first relative position/posture calculation process 3 maybe supported by the worker 33 or may be singly placed independently.

In the embodiment, the first relative position/posture 310 is calculated by the first relative position/posture calculation process 3, but the first relative position/posture 310 may be a numerical value given in advance based on design data.

FIG. 3A is a diagram illustrating a detailed configuration of the second end effector and the position/posture fixing tool according to the first embodiment.

The second end effector 12 includes, as a gripping structure, a base member 123 in which a position/posture is measured and a pair of gripping members 121 and 122 that are mounted on the base member 123 and sandwich the position/posture fixing tool 13 and the work object. The gripping members 121 and 122 of the second end effector 12 include contact surfaces 1211 (a contact surface of the gripping member 122 is not illustrated) and fitting portions 1212 and 1222, respectively.

The gripping members 121 and 122 can operate in opposite opening and closing directions 120.

The second end effector 12 implements a gripping operation by interposing the work object by the gripping members 121 and 122, and the base member 123 is fixed to any robot.

The second end effector 12 contains an actuator for electric or fluid pressure operation driven by a signal from the robot or an external controller and a power transfer mechanism that transfers power of the actuator to the gripping member 121 and/or 122.

The grip member 131 illustrated in FIG. 3A is the same as the grip member 131 illustrated in FIG. 2A, and fittable portions 132 (a fittable portion corresponding to the fitting portion 1212 is not illustrated) are fitted in the fitting portion 1212 of the gripping member 121 and the fitting portion 1222 of the gripping member 122.

The fitting portions 1112 and 1122 of the first end effector 11 and the fitting portions 1212 and 1222 of the second end effector 12 are required to have the same shape and same dimensions so that the fittable portions 132 of the position/posture fixing tool 13 are fitted. Meanwhile, shapes (the lengths and sizes of the gripping members 111 and 112 and the length and size of the base member 113) other than the fitting portions may differ.

The position/posture fixing tool 13 is interposed by the gripping members 111 and 112 so that the fittable portions 132 are fitted in the fitting portions 1112 and 1122 in the first relative position/posture calculation process 3, and thus a position/posture with respect to the first end effector 11 is geographically restricted and uniquely determined.

The position/posture fixing tool 13 is interposed by the gripping members 121 and 122 so that the fittable portions 132 are fitted in the fitting portions 1212 and 1222 in the second relative position/posture calculation process 4, and thus a position/posture with respect to the second end effector 12 is geographically restricted and uniquely determined.

FIG. 3B is a diagram illustrating the second relative position/posture calculation process according to the first embodiment. In the second relative position/posture calculation process 4, positions/postures of the markers 126 and 133 in which a work table coordinate system 47Σw fixed to the work table 45 is used as a reference are acquired by installing the measurement unit 42 which is a measurement camera at a position at which the entire work table 45 can be overlooked by a measurement unit post 421 and optically detecting light reflected from the markers 126 and 133.

A measurement unit of the marker 126 is similar to the above-described markers 116 and 133 and acquires a position/posture using reflection spheres (not illustrated by a reference numeral) provided on the marker 126.

A position/posture of the second end effector 12 according to the embodiment is determined on a second end effector coordinate system 127Σ2 fixed to the marker 126.

The measurement unit 42 acquires a homogeneous transformation matrix wT2 representing a position/posture of the second end effector coordinate system 127Σ2 in which the work table coordinate system 47Σw is a reference and homogeneous transformation matrix wTt representing a position/posture of the fixing tool coordinate system 134Σt in which the work table coordinate system 47Σw is a reference, and calculate a homogeneous transformation matrix 2Tt as the second relative position/posture 410 by a formula 2Tt=(wT2)$^{-1}$·wTt from the two homogeneous transformation matrices. In the embodiment, a corner of the work table 45 is set as the work table coordinate system 47Σw, but any method may be used to take the work table coordinate system 47Σw.

The second end effector 12 in the second relative position/posture calculation process 4 maybe supported by the robot 43 as illustrated in FIG. 3B or may be singly placed independently from the robot.

In the embodiment, the second relative position/posture 410 is calculated by the second relative position/posture calculation process 4, but the second relative position/posture 410 may be a numerical value given in advance based on design data.

A position/posture of the second end effector 12 in the second relative position/posture calculation process 4 is measured by the measurement unit 42 as a position/posture of the marker 126 fixed to a marker fixing member 125, as described above. Note that, the position/posture of the second end effector 12 can be acquired as a solution of kinematics calculation using a design parameter and joint angle information of the robot 43 without using the position/posture of the marker 126. In this case, to improve teaching accuracy, a position/posture of a coordinate system Σr (not illustrated) fixed to the robot 43 and viewed from the work table coordinate system 47Σw is required to be known.

In the measurement units 32 and 42, in calculation of the first relative position/posture 310 and the second relative position/posture 410, only a pair of pieces of position/posture information measured under any condition at any time moment may be used for calculation, or at least two or more pairs of pieces of position/posture information may be measured, the first relative position/posture 310 and the second relative position/posture 410 may be calculated for each pair, and an average of the first relative position/posture 310 and the second relative position/posture 410 may be taken. When noise is included in outputs of the measurement units 32 and 42, averages at a plurality of points can be taken to obtain a measurement result more accurately.

FIG. 4 is a diagram illustrating an operation of a teaching data transformation unit according to the first embodiment. FIG. 5A is a diagram illustrating the first end effector use teaching process according to the first embodiment. Specifically, FIG. 5A illustrates an aspect in which the teacher 23 teaches work including a gripping state of the work object 24 using the first end effector 11 in the first end effector use teaching process 2. In FIG. 5A, work for inserting the work object 24 into a work environment structure 26 on the work table 25 is exemplified as an example of the work.

In the example of FIG. 5A, the marker 116 fixed to the first end effector 11 held by the teacher 23 is measured by the measurement unit 22 for each given period of time, and the first end effector use teaching unit 21 generates a position/posture of the first end effector coordinate system 117Σ1 fixed to the marker 116 as the first teaching data 210 and measurement time. The position/posture of the first end effector coordinate system 117Σ1 fixed to the marker 116 is a position/posture at which a work table coordinate system 27Σw fixed to the work table 25 is a reference and is expressed with the homogeneous transformation matrix wT1.

Even when a state (occlusion) where the first end effector 11 and the work object 24 are hidden to the measurement unit 22 by a shadow of the work environment structure 26 is assumed, as described above, the measurement unit 22 can measure the markers 116 by designing the marker fixing member 115 so that the markers 116 are within a measurement range of the measurement unit 22.

As illustrated in FIG. 4, the teaching data transformation unit 6 transforms the first teaching data 210 representing the position/posture of the first end effector 11 generated by the first end effector use teaching unit 21 into the second teaching data 510 which is the position/posture of the second end effector 12 using the first relative position/posture 310 calculated by the first relative position/posture calculation unit 31 and the second relative position/posture 410 calculated by the second relative position/posture calculation unit 41, and transmits the transformed second teaching data 510 to the robot control unit 51.

For example, the teaching data transformation unit 6 includes a first coordinate transformation unit 61 and a second coordinate transformation unit 62. The first coordinate transformation unit 61 transforms the homogeneous transformation matrix wT1 at each measurement time generated as the first teaching data 210 into the homogeneous transformation matrix wTt (third teaching data 610) representing a position/posture of the fixing tool coordinate system 134Σt using the homogeneous transformation matrix 1Tt representing the first relative position/posture 310 and the formula wTt=wT1·1Tt.

The second coordinate transformation unit 62 transforms the homogeneous transformation matrix wTt transformed as the third teaching data 610 into the homogeneous transformation matrix wT2 (second teaching data 510) representing a position/posture of the second end effector 12 using the homogeneous transformation matrix 2Tt representing the second relative position/posture 410 and the formula wT2=wTt·(2Tt)$^{-1}$.

FIG. 5B is a diagram illustrating an image of coordinate transformation in the first coordinate transformation unit 61 shown on a work space according to the first embodiment. As illustrated in FIG. 5B, the first teaching data 210 is expressed with a trajectory of a plurality of teaching points (for example, seven points from different times t1 to t7) viewed from the work table coordinate system 27Σw.

As described above, all the teaching points of the first teaching data 210 are transformed into the homogeneous transformation matrix wTt (the third teaching data 610) representing the position/posture of the fixing tool coordinate system 134Σt viewed from the work table coordinate system 27Σw by multiplying the homogeneous transformation matrix wT1 representing positions/postures of the teaching points (in FIG. 5B, the teaching points of t1 to t7) of the first teaching data 210 viewed from the work table coordinate system 27Σw by the homogeneous transformation matrix 1Tt of the first relative position/posture 310 calculated in advance by the first relative position/posture calculation unit 31.

FIG. 5C is a diagram illustrating an image of coordinate transformation and a robot operation process in a second coordinate transformation unit shown on a work space according to the first embodiment. Work for inserting the work object 54 into the work environment structure 56 on a work table 55 as in the first end effector use teaching process 2 is exemplified.

As described above, all the teaching points of the third teaching data 610 are transformed into the homogeneous transformation matrix wT2 (the second teaching data 510) representing the position/posture of the second end effector 12 viewed from the work table coordinate system 57Σw by multiplying the homogeneous transformation matrix wTt representing positions/postures of the teaching points (in FIG. 5C, the teaching points of t1 to t7) of the third teaching data 610 viewed from the work table coordinate system 57Σw by an inverse matrix of the homogeneous transformation matrix 2Tt of the second relative position/posture 410 calculated in advance by the second relative position/posture calculation unit 41.

FIG. 6 is a diagram illustrating a robot control unit according to the first embodiment. In the robot operation process 5, the robot control unit 51 cause the robot 53 to operate based on the second teaching data 510. Specifically, the robot control unit 51 causes the robot 53 to reproduce predetermined work including gripping of the work object 54 performed using the first end effector 11 by controlling the robot 53 such that the position/posture of the second end effector 12 included in the second teaching data 510 matches the position/posture of the second end effector 12 mounted on the robot 53.

The robot control unit 51 includes, for example, a teaching data correction unit 511, an inverse kinematics calculation unit 512, and a robot operation instruction unit 513.

The teaching data correction unit 511 transforms the second teaching data 510 which is position/posture information of the second end effector 12 in which the work table coordinate system 57Σw is a reference into position/posture information of the second end effector 12 in which a coordinate system Σr (not illustrated) fixed to the robot 53 is a reference.

The inverse kinematics calculation unit 512 calculates an angle of a joint of the robot 53 as a solution of inverse kinematics so that the second teaching data 510 is reproduced by using the second teaching data 510 transformed by the teaching data correction unit 511 and the design parameter of the robot 53.

The robot operation instruction unit 513 transmits an operation instruction 514 to the robot 53 based on a result of the inverse kinematics calculation unit 512. When the solution of the inverse kinematics calculation unit 512 cannot be obtained, an error code is output as a code indicating that execution is not possible.

In the robot operation process 5 according to the first embodiment, the measurement unit 52 (the third measurement unit) measures the position/posture of the second end effector 12 at the time when the robot control unit 51 controls of the robot 53 based on the second teaching data 510 as the actual operation data 520 and the second teaching data 510 is corrected so that the second teaching data 510 matches the actual operation data 520. For example, the teaching data correction unit 511 compares the position/posture of the second end effector 12 in the second teaching data 510 with the position/posture of the second end effector 12 in the actual operation data 520, detects a deviation in the position/posture, and calculates an offset for correcting the detected deviation in the position/posture. The second teaching data 510 is corrected so that the second teaching data 510 matches the actual operation data 520 by adding the offset to the position/posture (the transformed second teaching data 510) of the second end effector 12 in which the coordinate system Σr (not illustrated) fixed to the robot 53 is a reference.

Instead of performing the correction using the measurement unit 52, the second teaching data 510 may be corrected using a solution of kinematics calculation in which the design parameter and the joint angle information of the robot 53 are used as a true value. In this case, to improve accuracy of taught predetermined work, the position/posture of the coordinate system Σr (not illustrated) fixed to the robot 53 and viewed from the work table coordinate system 57Σw is required to be known, and the design parameter and the joint angle information of the robot 53 is required to be highly accurate.

In the embodiment, the measurement units 22, 32, 42, and 52 are described as different units, but may be the same unit.

The robot 53 in the robot operation process 5 maybe the same robot as or a separate robot from the robot 43 in the second relative position/posture calculation process 4.

When the robot control unit 51 controls the robot 53 in accordance with the first teaching data 210 representing the position/posture of the first end effector coordinate system 117Σ1, the robot control unit 51 controls the robot 53 such that the second end effector coordinate system 127Σ2 illustrated in FIG. 3B traces the position/posture of the first end effector coordinate system 117Σ1 illustrated in FIG. 2B. In this case, for example, when relative positions/postures of the gripping members 111 and 112 to the base member 113 (the first end effector coordinate system 117Σ1) are different from relative positions/postures of the gripping members 121 and 122 to the base member 123 (the second end effector coordinate system 127Σ2), that is, when there is a device difference or the like between the first end effector 11 and the second end effector 12, the gripping members 121 and 122 of the second end effector 12 cannot accurately trace the positions/postures of the gripping members 111 and 112 of the first end effector 11 even when the second end effector coordinate system 127Σ2 accurately traces the position/posture of the first end effector coordinate system 117Σ1.

In the first relative position/posture calculation process 3 according to the embodiment, the relative position/postures of the gripping members 111 and 112 to the position/posture fixing tool 13 are uniquely determined, and therefore an accurate position/posture (tool center point) of the gripping structure is actually determined from the fixing tool coordinate system 134Σt. Therefore, in the embodiment, a relative position/posture between the first end effector coordinate system 117Σ1 and the fixing tool coordinate system 134Σt is calculated as the first relative position/posture 310.

In the second relative position/posture calculation process 4 according to the embodiment, the relative position/postures of the gripping members 121 and 122 to the position/posture fixing tool 13 are uniquely determined, and therefore an accurate position/posture (tool center point) of the gripping structure is actually determined from the fixing tool coordinate system 134Σt. Therefore, in the embodiment, a relative position/posture between the second end effector coordinate system 127Σ2 and the fixing tool coordinate system 134Σt is calculated as the second relative position/posture 410.

By transforming the first teaching data 210 into the second teaching data 510 using the first relative position/posture 310 and the second relative position/posture 410, the taught predetermined work is reproduced with high accuracy even when there is a device difference or the like between the first end effector 11 and the second end effector 12.

In the foregoing example, the example in which the positions/postures of the markers 116, 126, and 133 are measured by the above-described optical motion capture system has been described. However, instead of this, a motion capture system that magnetically detects a motion of a gripped work object using a Hall element or the like can also be adopted. Alternatively, a system in which the marker is not used, an operation of a work object or the teacher 23 is imaged with a camera and the image is analyzed can also be adopted.

The positions/postures (tool center points) of the gripping members 111 and 112 can be calculated from the first end effector coordinate system 117Σ1 and the design data. However, since there are dimension errors or assembly errors in the marker fixing member 115, the base member 113, and the gripping members 111 and 112, it is difficult to calculate the positions/postures (tool center points) of the gripping members 111 and 112 with high accuracy in some cases. In these cases, according to the embodiment, since the positions/postures of the gripping members 111 and 112 are determined from the position/posture of the position/posture fixing tool 13 based on the actual measurement, it is less likely to be affected by the foregoing errors.

It is also conceived that the second end effector mounted on the robot is detached and used for teaching as it is, but there is a case where the second end effector mounted on the robot cannot be easily treated due to a size, a weight, or the like. In this case, there is no choice but to use the first end effector having a device difference or the like with respect to the second end effector. According to the present invention, since there is no problem even when there is a device difference or the like between the first end effector and the second end effector, and thus, teaching can be performed irrespective of a size or weight of the second end effector. Accordingly, the robot teaching system according to the invention can be used more generally.

Second Embodiment

A configuration of a robot teaching system 1 according to a second embodiment of the present invention will be described. In the present embodiment, differences from the first embodiment will be mainly described and configurations of which description is omitted are similar to those of the first embodiment.

FIG. 7A is a diagram illustrating a configuration and an operation of a teaching data transformation unit according to the second embodiment. The robot teaching system 1 according to the second embodiment includes at least two first end effectors 11 and at least two second end effectors 12. In the present embodiment, the robot teaching system 1 including, for example, two first end effectors (11a and 11b) and two second end effectors (12a and 12b) will be described. In the present embodiment, in reference numerals formed by numerals and alphabet letters, the numerals correspond to the reference numerals of the first embodiment and the alphabet letters represent which end effector is related. For example, a first end effector use teaching unit 21a illustrated in FIG. 7A corresponds to the first end effector use teaching unit 21 in the first embodiment and represent that the first end effector 11a according to the present embodiment is related.

The first end effectors 11a and 11b and the second end effectors 12a and 12b all include gripping members in which a fitting portion fitted in the fittable portion 132 of the position/posture fixing tool 13 is provided as in the first embodiment. Here, dimensions and driving schemes are not limited.

FIG. 7A illustrates an example in which the robot 53 on which the second end effector 12b is mounted is operated based on first teaching data 210a generated through teaching using the first end effector 11a.

The teaching data transformation unit 6 further includes a first relative position/posture storage unit 63, a second relative position/posture storage unit 64, and a teaching data storage unit 65 in addition to the first coordinate transformation unit 61 and the second coordinate transformation unit 62.

The first relative position/posture storage unit 63 stores position/posture information of the first end effector 11a generated by the first relative position/posture calculation process 3 in which the first end effector 11a is used in association with an identifier (first identifier) for identifying information regarding the first end effector 11a as first relative position/posture 310a, and stores position/posture information of the first end effector 11b generated by the first relative position/posture calculation process 3 in which the first end effector 11b is used in association with an identifier (first identifier) for identifying information regarding the first end effector 11b as first relative position/posture 310b.

The second relative position/posture storage unit 64 stores position/posture information of the second end effector 12a generated by the second relative position/posture calculation process 4 in which the second end effector 12a is used in association with an identifier (second identifier) for identifying information regarding the second end effector 12a as second relative position/posture 410a, and stores position/posture information of the second end effector 12b generated by the second relative position/posture calculation process 4 in which the second end effector 12b is used in association with an identifier (second identifier) for identifying information regarding the second end effector 12b as second relative position/posture 410b.

The first end effector use teaching unit 21a generates first teaching data 210a including the position/posture information of the first end effector 11a during a teaching operation through the first end effector use teaching process 2 in which the first end effector 11a is used and the identifier for identifying the information regarding the first end effector 11a.

When the first teaching data 210a is input, the first coordinate transformation unit 61 generates third teaching data 610a by using the identifier included in the first teaching data 210a and referring to the first relative position/posture 310a corresponding to the identifier from the first relative position/posture storage unit 63, and stores the third teaching data 610a in the teaching data storage unit 65.

Similarly, a first end effector use teaching unit 21b (not illustrated) generates first teaching data 210b through the first end effector use teaching process 2 in which the first end effector 11b is used. When the first teaching data 210b is input, the first coordinate transformation unit 61 generates third teaching data 610b by using the identifier included in the first teaching data 210b and referring to the first relative position/posture 310b corresponding to the identifier from the first relative position/posture storage unit 63, and stores the third teaching data 610b in the teaching data storage unit 65.

The teaching data storage unit 65 stores the third teaching data 610a and the third teaching data 610b.

The second coordinate transformation unit 62 receives robot control condition data 515b including information indicating which second end effector is to be controlled (for example, an identifier of the second end effector 12b) and information indicating which teaching data is to be reproduced (for example, the third teaching data 610a is reproduced) from a robot control unit 51b and generates second teaching data 510b with reference to the second relative position/posture 410b corresponding to the corresponding identifier from the second relative position/posture storage unit 64 and the corresponding third teaching data 610a from the teaching data storage unit 65.

Here, the teaching data storage unit 65 may store at least one of the first teaching data 210, the second teaching data 510, and the third teaching data 610 and the data is treated as teaching data information appropriate for transformation or inverse transformation in accordance with the corresponding first relative position/posture 310 and second relative position/posture 410. For example, FIG. 7B illustrates another example of the configuration of the teaching data transformation unit according to the second embodiment. In this case, the teaching data storage unit 65 stores the first teaching data 210a and the first teaching data 210b. The first coordinate transformation unit 61 refers to the corresponding first teaching data 210a from the teaching data storage unit 65 based on the robot control condition data 515b (in the embodiment, the first teaching data 210a is reproduced).

FIG. 7C illustrates another example of the configuration of the teaching data transformation unit according to the second embodiment. The teaching data storage unit 65 stores the second teaching data 510a and the second teaching data 510b. The robot control unit 51b refers to the corresponding second teaching data 510b from the teaching data storage unit 65 based on the robot control condition data 515b (in the present embodiment, the robot 53 on which the second end effector 12b is mounted is caused to reproduce the second teaching data 510b).

According to the present embodiment, even when any first teaching data 210 is selected from the plurality of pieces of first teaching data 210 generated using the different first end effectors 11 and the robot is caused to reproduce the first teaching data, the taught predetermined work is reproduced with high accuracy.

Third Embodiment

A third embodiment is a modified example of the first and second embodiments. FIG. 8 is a diagram illustrating the first end effector according to the third embodiment. In the present embodiment, differences from the first and second embodiments will be mainly described and configurations of which description is omitted are similar to those of the first and second embodiments.

The first end effector 11 according to the third embodiment is a tool made by modeling the second end effector 12, is not mounted on the robot, and is held and treated by a worker.

The first end effector 11 includes a first end effector operation unit 118 and a power transfer unit 119 that transfers an operation force added to the first end effector operation unit 118 and operates the gripping members 111 and 112 in opening and closing directions 110.

The first end effector operation unit 118 serving as, for example, a pressing switch contains a battery and an actuator (not illustrated) inside the first end effector 11 and recognizes a press of the first end effector operation unit 118 by an electric signal to drive the power transfer unit 119. The first end effector operation unit 118 is not limited thereto. For example, a rotational force added to a lever may be transferred with a gear by the lever to drive the power transfer unit 119 without containing the battery or the actuator inside the first end effector 11.

In the foregoing configuration, the weight of the first end effector 11 can be reduced than the second end effector 12 actually connected to the robot 53, and a work object gripping operation can be taught at a desired timing of the teacher 23 in the first end effector use teaching process 2. Therefore, it is possible to provide the robot teaching system capable of performing teaching more easily.

Fourth Embodiment

A fourth embodiment is a modified example of the first and second embodiments. FIG. 9 is a diagram illustrating a first end effector use teaching process according to the fourth embodiment. In the present embodiment, differences from the first and second embodiments will be mainly described and configurations of which description is omitted are similar to those of the first and second embodiments.

The first end effector 11b according to the fourth embodiment is an end effector which can be connected to the robot and may be an end effector which is the same as any of the second end effectors 12. The first end effector 11b is mounted on a teaching robot 28 and can operate the gripping members 111b and 112b by driving the contained actuator in accordance with an external signal.

The teacher 23 operates the teaching robot 28 using the robot operation unit 29 in the first end effector use teaching process 2. At this time, the position/posture of the first end effector 11b is calculated by the first end effector use teaching unit 21b and the first teaching data 210b is generated.

A position/posture of the first end effector 11b serving as the first teaching data 210b may be acquired as a solution of kinematics calculation using joint angle information and a design parameter of the teaching robot 28, or a marker 116b (not illustrated) fixed to the first end effector 11b may be measured by the measurement unit 22.

In the foregoing configuration, robots in which end effectors have a common gripping structure can share teaching data although the robots are different robots.

REFERENCE SIGNS LIST

1: robot teaching system
11: first end effector
111, 112: gripping member
1111: contact surface
1112, 1122: fitting portion
113: base member
114: handle member
115: marker fixing member
116: marker
117$\Sigma$1: first end effector coordinate system
118: first end effector operation unit
119: power transfer unit
110: opening and closing direction
12: second end effector
121, 122: gripping member
1211: contact surface
1212, 1222: fitting portion
123: base member
125: marker fixing member
126: marker
127$\Sigma$2 second end effector coordinate system
120: opening and closing direction 13: position/posture fixing tool
131: grip member
132: fittable portion
133: fixing-tool marker
134Σt fixing tool coordinate system
2: first end effector use teaching process
21: first end effector use teaching unit
210: first teaching data
22: measurement unit
23: teacher
24: work object
25: work table
26: work environment structure
27Σw: work table coordinate system
28: teaching robot
29: robot operation unit
3: first relative position/posture calculation process
31: first relative position/posture calculation unit
310: first relative position/posture
32: measurement unit
321: measurement unit post
33: worker
35: work table
37Σw: work table coordinate system
4: second relative position/posture calculation process
41: second relative position/posture calculation unit
410: second relative position/posture
42: measurement unit
421: measurement unit post
43: robot
45: work table
47Σw: work table coordinate system
5: robot operation process
51: robot control unit
510: second teaching data
511: teaching data correction unit
512: inverse kinematics calculation unit
513: robot operation instruction unit
514: operation instruction
515: robot control condition data
52: measurement unit
520: actual operation data
53: robot
54: work object
55: work table
56: work environment structure
57Σw: work table coordinate system
6: teaching data transformation unit
61: first coordinate transformation unit
610: third teaching data
62: second coordinate transformation unit
63: first relative position/posture storage unit
64: second relative position/posture storage unit
65: teaching data storage unit

The invention claimed is:

1. A robot teaching system comprising:
a first end effector having a gripping structure and used for teaching;
a second end effector having the gripping structure and mounted on a robot;
a position/posture fixing tool having a gripped structure in which a position and a posture with respect to the first end effector and the second end effector are uniquely determined by being gripped by the gripping structure of the first end effector and the second end effector;
a teaching data transformation unit configured to transform first teaching data representing position/posture information of the first end effector during a teaching operation into second teaching data representing position/posture information of the second end effector; and
a robot control unit configured to cause the robot to operate based on the second teaching data,
wherein the teaching data transformation unit transforms the first teaching data into the second teaching data using
a first relative position/posture indicating a relative position/posture between the first end effector and the position/posture fixing tool when the position/posture fixing tool is gripped, and
a second relative position/posture indicating a relative position/posture between the second end effector and the position/posture fixing tool when the position/posture fixing tool is gripped.

2. The robot teaching system according to claim 1, further comprising:
a first measurement unit configured to measure a position/posture of the first end effector and a position/posture of the position/posture fixing tool gripped by the first end effector;
a second measurement unit configured to measure a position/posture of the second end effector and a position/posture of the position/posture fixing tool gripped by the second end effector;
a first relative position/posture calculation unit configured to calculate the first relative position/posture based on the position/posture of the first end effector and the position/posture of the position/posture fixing tool gripped by the first end effector; and
a second relative position/posture calculation unit configured to calculate the second relative position/posture based on the position/posture of the second end effector and the position/posture of the position/posture fixing tool gripped by the second end effector.

3. The robot teaching system according to claim 2,
wherein each of the first end effector, the second end effector, and the position/posture fixing tool has a marker, and
wherein the first measurement unit and the second measurement unit measure the position/posture of each of the first end effector, the second end effector, and the position/posture fixing tool by measuring the marker.

4. The robot teaching system according to claim 1, further comprising:
a first storage unit configured to store the first relative position/posture,
wherein the first end effector includes a first identifier which is an identifier of the first end effector,
wherein the first storage unit stores the first relative position/posture in association with the first identifier,
wherein the first teaching data includes position/posture information of the first end effector used for teaching and the first identifier of the first end effector used for the teaching, and
wherein the teaching data transformation unit transforms the first teaching data into the second teaching data based on the first relative position/posture corresponding to the first identifier included in the first teaching data.

5. The robot teaching system according to claim 1, further comprising:
a second storage unit configured to store the second relative position/posture,
wherein the second end effector includes a second identifier which is an identifier of the second end effector, wherein the second storage unit stores the second relative position/posture in association with the second identifier, and wherein the teaching data transformation unit transforms the first teaching data into the second teaching data based on the second relative position/posture corresponding to the second identifier of the second end effector mounted on the robot.

6. The robot teaching system according to claim 1, further comprising:

a teaching robot; and an operation unit configured to operate the teaching robot, wherein the first end effector is mounted on the teaching robot.

7. The robot teaching system according to claim 1, wherein the teaching data transformation unit transforms the first teaching data into third teaching data representing a position/posture of the position/posture fixing tool using the first relative position/posture, and transforms the third teaching data into the second teaching data using the second relative position/posture.

8. The robot teaching system according to claim 1, further comprising:

a third measurement unit configured to measure a position/posture of the second end effector when the robot control unit controls the robot based on the second teaching data as actual operation data, wherein the robot control unit corrects the second teaching data so that the second teaching data matches the actual operation data.

9. The robot teaching system according to claim 1, wherein each of the first end effector and the second end effector includes, as the gripping structure, a base member of which a position/posture is measured and a pair of gripping members that are mounted on the base member and sandwich the position/posture fixing tool and a work object, wherein the pair of gripping members have contact surfaces with which the position/posture fixing tool and the work object come into contact and fitting portions provided on the contact surfaces, and wherein the position/posture fixing tool has fittable portions fitted in the fitting portions of the pair of gripping members as at least parts of the gripped structure.

10. The robot teaching system according to claim 9, wherein the base member of the first end effector includes an operation unit operated by a teacher and a power transfer unit that transfers operation power applied to the operation unit and operates the gripping member so that the operation unit is interlocked with the gripping member.

* * * * *